United States Patent [19]

Whitley et al.

[11] 4,220,369

[45] Sep. 2, 1980

[54] FOLDABLE TRUNK-MOUNTABLE CAMPER

[76] Inventors: William N. Whitley, 19315 Shaker Blvd.; James M. Whitley, 2963 Morley, both of Shaker Heights, Ohio 44122

[21] Appl. No.: 935,649

[22] Filed: Aug. 21, 1978

Related U.S. Application Data

[63] Continuation-in-part of Ser. No. 880,083, Feb. 22, 1978, Pat. No. 4,181,348, and Ser. No. 880,319, Feb. 22, 1978.

[51] Int. Cl.² .............................................. B60D 3/32
[52] U.S. Cl. ................................................. 296/164
[58] Field of Search ............... 296/164, 165, 156, 26, 296/27; 52/67

[56] References Cited

U.S. PATENT DOCUMENTS

| | | | |
|---|---|---|---|
| Re. 29,264 | 6/1977 | Woodward | 296/23 MC |
| D. 192,795 | 5/1962 | Sloat | D12/156 |
| D. 195,195 | 5/1963 | Hunter | D12/156 |
| D. 197,556 | 2/1964 | Coco | D12/156 |
| D. 198,497 | 6/1964 | Leichner | D12/156 |
| D. 214,036 | 5/1969 | Reinarts | D12/156 |
| D. 214,727 | 7/1969 | Perry | D12/156 |
| D. 219,373 | 12/1970 | Serino | D12/156 |
| D. 230,261 | 2/1974 | Woodward | D12/156 |
| D. 238,942 | 2/1976 | Dixon | D12/156 |
| D. 247,711 | 4/1978 | Pittman | D12/156 |
| 1,850,638 | 3/1932 | Schioler | 296/23 R |
| 1,984,681 | 12/1934 | Jackson | 296/23 R |
| 2,359,577 | 10/1944 | Patrick | 296/23 R |
| 2,493,368 | 1/1950 | Smelker | 296/23 MC |
| 2,531,678 | 11/1950 | Gladhill | 296/23 MC |
| 2,561,168 | 7/1951 | Beckley | 296/23 R |
| 2,567,104 | 9/1951 | Fonzo | 296/23 R |
| 2,614,882 | 10/1952 | Cook | 296/23 MC |
| 2,625,165 | 1/1953 | Eskew | 296/23 R |
| 2,645,518 | 7/1953 | Cook | 296/23 MC |
| 2,718,015 | 9/1955 | Fisk | 296/23 R |
| 2,800,264 | 7/1957 | McFadyen | 296/23 MC |
| 2,907,077 | 10/1959 | Pugsley | 296/23 MC |
| 2,917,059 | 12/1959 | Emanuelson | 296/23 R |
| 2,930,051 | 3/1960 | Kampmeier | 296/23 R |
| 2,942,609 | 6/1960 | Ferguson | 296/23 R |
| 3,003,808 | 10/1961 | Swanberg | 296/23 MC |
| 3,097,013 | 7/1963 | Mussler | 296/23 R |
| 3,111,955 | 11/1963 | Green | 296/23 R |
| 3,143,121 | 8/1964 | McKee | 296/23 MC |
| 3,160,434 | 12/1964 | Hedgepeth | 296/23 R |
| 3,185,518 | 5/1965 | Zentner | 296/23 MC |
| 3,191,829 | 6/1965 | Davis | 296/23 MC |
| 3,257,019 | 6/1966 | Carroll | 296/23 MC |
| 3,259,422 | 7/1966 | Canon | 296/23 MC |
| 3,283,452 | 11/1966 | Hayes | 296/23 R |
| 3,288,517 | 11/1966 | Bender | 296/23 MC |
| 3,288,519 | 11/1966 | McFarland | 296/23 MC |
| 3,290,084 | 12/1966 | McPherson | 296/23 MC |
| 3,321,876 | 5/1967 | Birkenheuer | 296/23 MC |
| 3,326,594 | 6/1967 | VanAtta | 296/23 MC |
| 3,337,259 | 8/1967 | Henson | 296/23 MC |
| 3,400,968 | 9/1968 | Smith | 296/23 MC |
| 3,410,598 | 11/1968 | Davis | 296/23 MC |
| 3,411,819 | 11/1968 | Tyree | 296/23 MC |
| 3,451,712 | 6/1969 | Power | 296/23 MC |
| 3,575,460 | 4/1971 | Kennedy | 296/23 R |
| 3,623,762 | 11/1971 | Fagan | 296/23 R |
| 3,628,825 | 12/1971 | Hanboosh | 296/23 R |
| 3,635,515 | 1/1972 | White | 296/23 MC |
| 3,652,121 | 3/1972 | Hjelm | 296/26 |
| 3,661,481 | 5/1972 | Stewart | 296/23 MC |
| 3,695,676 | 10/1972 | Clark | 296/23 MC |
| 3,733,102 | 5/1973 | Serino | 296/23 MC |
| 3,746,386 | 7/1973 | Woodward | 296/23 MC |
| 3,762,759 | 10/1973 | Hall | 296/23 MC |
| 3,774,957 | 11/1973 | Basaraba | 296/23 MC |
| 3,863,977 | 2/1975 | Hardinge | 296/23 MC |

*Primary Examiner*—John J. Love
*Assistant Examiner*—John A. Carroll
*Attorney, Agent, or Firm*—Burge & Porter Co.

[57] ABSTRACT

A lightweight, foldable camper capsule for automobiles is releasably mountable about trunk portions of an automobile without requiring the formation of holes in the automobile body, whereby the watertight integrity of the automobile trunk compartment is maintained. The camper capsule has side, front, top and back wall portions which are foldable to overlie the trunk compartment of an automobile, thereby enabling a relatively large camper capsule having a capability of sleeping three adults to be collapsed to a substantially reduced size for over-the-road travel. In one embodiment, the foldable side, front, top and back wall portions are formed from rigid materials and are pivotally mounted for folding. In another embodiment, the foldable side, front, and top wall portions are formed from flexible material such as canvass supported on a foldable framework.

20 Claims, 18 Drawing Figures

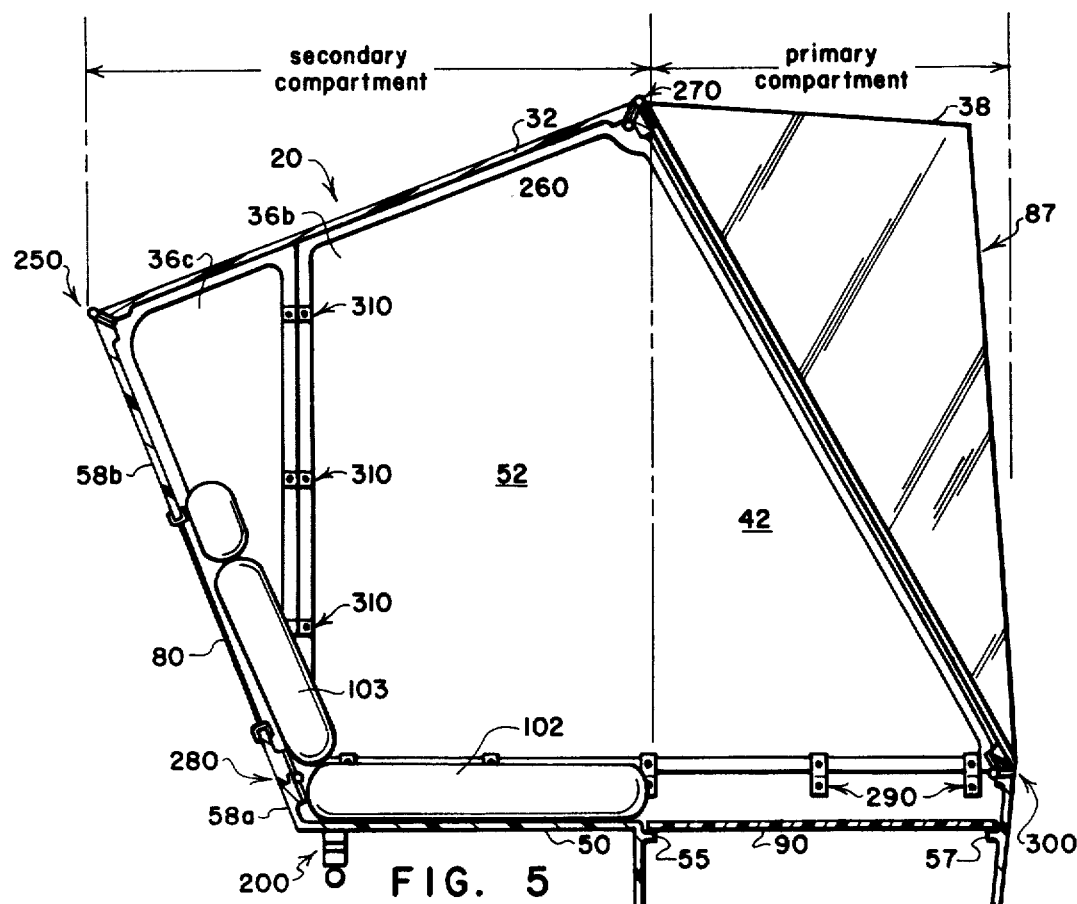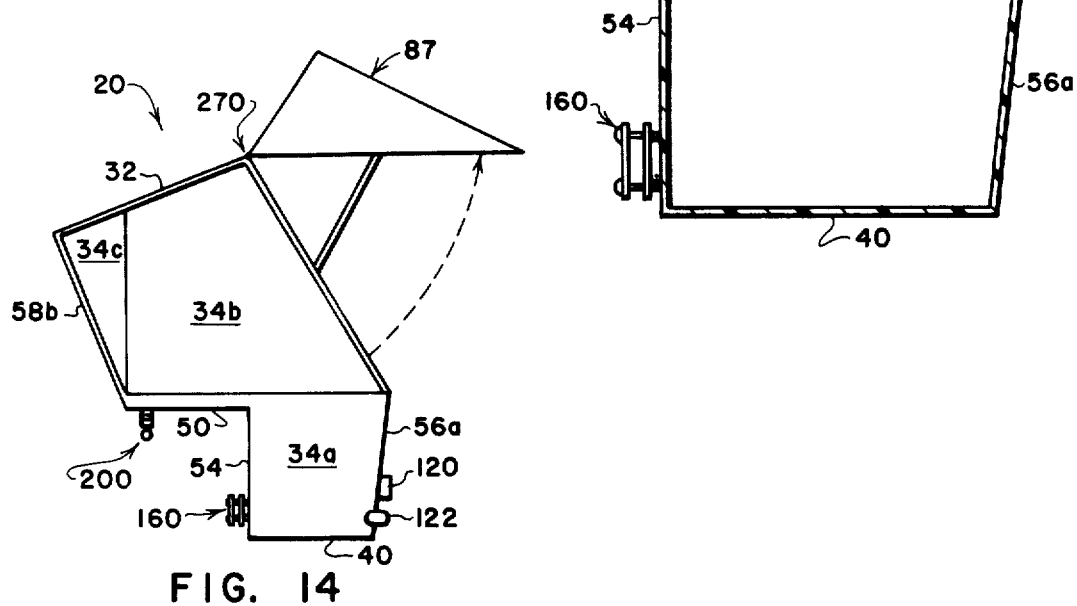

FOLDABLE TRUNK-MOUNTABLE CAMPER

CROSS-REFERENCE TO RELATED APPLICATIONS

The present application is a continuation-in-part of Utility patent application Ser. No. 880,083, now U.S. Pat. No. 4,181,348 (here the Parent Utility Patent) and of Design patent application Ser. No. 880,319 (here the Parent Design Patent), both of these applications having been filed on Feb. 22, 1978, the disclosures of both of these applications (here the Parent Patents) being incorporated herein by reference.

BACKGROUND OF THE INVENTION

1. Field of the Invention

The present invention relates generally to a trunk-mountable camper capsule for automobiles and, more particularly to a novel and improved, lightweight, foldable camper capsule which can be removably mounted about trunk portions of an automobile to provide accommodations for three persons while permitting ready access to the trunk of the automobile.

2. Prior Art

While proposals have been made for various types of shelters adapted for attachment to portions of automobiles, most such proposals have suffered one or more of the following drawbacks:

(A) the proposed structures have been relatively massive, both in size and weight, and, in many instances, have required specialized equipment to effect their mounting on and removal from an automobile;

(B) where the proposed structures have been of sufficiently large size to accommodate a plurality of persons, the weight of these units has undesirably affected the driving characteristics of the automobile, and, in some instances, has required the installation of special suspension system equipment and/or the use of additional wheels to support the structures;

(C) where proposed shelter structures have been designed for mounting over the trunk of a vehicle, they have either required removal of the trunk lid in order to permit the use of the trunk space or have been mounted at distances sufficiently removed from the trunk lid to permit its opening, or have prohibited access to the trunk; and, (D) many proposals for automobile-mounted shelters have required the installation of fasteners through the body of the car and have thereby destroyed the watertight integrity of the trunk and/or passenger compartment.

In some instances, proposed shelters adapted for trunk mounting have, themselves, occupied the vast majority of the trunk space and have thereby prohibited the normal use of the trunk compartment.

Still another problem encountered with many proposals for automobile-mounted shelters is that the shelters are difficult to store in a garage stall in such a manner as will permit normal use of the stall by an automobile. Where proposed shelters have been storable in a garage stall without inhibiting normal use of the stall by an automobile, most have required relatively elaborate stands or guy-wire systems to support the shelters above the garage floor or in a suspended attitude from the garage ceiling.

While many proposals have been made for automobile-mounted shelters of various types, prior to the conception of the invention described in the referenced Utility Patent, the need had gone unanswered for a relatively simple and inexpensive, easy to install, easy to store, lightweight camper capsule which would not prohibit effective use of the trunk space of an automobile.

3. The Parent Patents

The referenced Parent Utility Patent addresses the foregoing and other drawbacks of the prior art by providing a novel and improved, trunk-mountable camper capsule for automobiles which is light in weight, which will accommodate a plurality of persons, which can be installed on an automobile, removed and stored with ease, and which does not prevent normal storage use of an automobile trunk compartment. The referenced Patent Design Patent relates to an attractive design configuration for such a camper capsule. Moreover, such camper capsules as may embody the subjects matter of one or both of the Parent Patents are adapted for use with a wide variety of automobile model configurations without requiring the insertion of fasteners through holes formed in the automobile body, whereby the watertight integrities of the automobile trunk and passenger compartments are preserved.

In accordance with the preferred practice of the invention described in the Parent Utility Patent, a trunk-mountable camper capsule includes a compartment-defining means and a mounting system for mounting the compartment-defining means about trunk portions of an automobile. The compartment-defining means includes an upstanding frame structure having spaced side walls with top and bottom walls extending transversely between and interconnecting the side walls to define four walls of a "primary" compartment adapted to be positioned rearwardly of the trunk compartment of an automobile. The compartment-defining means also includes a forwardly-extending structure having spaced side walls with top and bottom walls extending transversely therebetween and interconnecting the side walls to define four walls of a "secondary" compartment adapted to overlie the trunk compartment of an automobile. The upstanding frame structure includes a forwardly-facing wall which interconnects the two bottom walls, and a rear wall interconnecting the frame's side, top and bottom walls. The forwardly-extending structure includes a front wall interconnecting the structure's side, top and bottom walls. The side walls and top walls of the frame and forwardly-extending structures are rigidly interconnected to communicate the primary and secondary compartments, whereby a single, large habitable enclosure is defined by the capsule.

While the camper capsule described in the Parent Utility Patent overcomes many drawbacks of prior art proposals, it is of rigid construction and does not have movable wall portions which will permit the capsule to be folded to provide a more compact configuration for over-the-road travel.

SUMMARY OF THE INVENTION

The present invention relates to an improvement in the construction of a camper capsule of the type described in the referenced Parent Utility Patent, which improvement permits the resulting camper capsule to be folded to a more compact configuration for the over-the-road travel without necessarily altering the unfolded appearance of the capsule from that shown in the referenced Parent Design Patent.

In accordance with the preferred practice of the present invention, a trunk-mountable camper capsule of the general character described in the referenced Parent Utility Patent includes a rigid bottom structure with a foldable upper structure. The rigid bottom structure includes wall portions defining essentially the bottom half of the camper described in the referenced Utility Patent. The foldable upper portion includes wall portions which define essentially the upper half of this camper. In one embodiment, the foldable wall portions are formed from rigid materials and are hingedly interconnected and arranged to be folded to a collapsed position overlying the trunk of an automobile on which the camper is mounted. In another embodiment, certain of the foldable walls are formed from flexible material such as canvas supported on frames, and the foldable walls are positionable in a collapsed position overlying the trunk of an automobile on which the camper is mounted.

In the first embodiment, a majority of the relatively rigid wall portions are preferably formed from plastics material such as glass fiber embedded in resin. In this embodiment, upper side wall portions are hingedly interconnected with lower side wall portions and are foldable inwardly to overlie the area of an automobile trunk compartment. With this embodiment, front, top and back wall portions are also hingedly interconnected and are foldable inwardly to overlie the trunk compartment of an automobile.

In the second embodiment, upper side wall portions and upper front and top wall portions are formed from flexible material such as canvas, the canvas being supported by movable framework members.

As will be apparent from the foregoing summary, it is an object of the present invention to provide a novel and improved, foldable, trunk-mountable camper for automobiles.

It is a further object of the present invention to provide a novel and improved, foldable, trunk-mountable camper capsule which is light in weight and which is adapted for use with a wide variety of automobile model configurations without preventing normal use of their trunk compartments.

It is a further object of the present invention to provide a novel and improved, foldable, trunk-mountable camper capsule which will accommodate three adults.

These and other objects and a fuller understanding of the invention described in the present application may be had by referring to the detailed description and the claims in conjunction with the accompanying drawings.

BRIEF DESCRIPTION OF THE DRAWINGS

FIG. 5 is an enlarged sectional view as seen from a plane indicated by a broken line 5—5 in FIG. 1;

FIG. 14 is a side elevational view of the camper capsule of FIG. 1 with upper portions of the back wall pivoted to an open position;

DESCRIPTION OF THE PREFERRED EMBODIMENT

In accordance with the preferred practice of the present invention, a trunk-mountable camper capsule of the general character described in the referenced Parent Utility Patent includes a rigid bottom structure with a foldable upper structure. The rigid bottom structure includes wall portions defining essentially the bottom half of the camper described in the referenced Utility Patent. The foldable upper portion includes wall portions which define essentially the upper half of this camper. In the embodiment illustrated in FIGS. 1-14, a camper capsule 20 has lower and upper portions 22, 24. The foldable upper portion 24 includes hingedly interconnected wall portions formed from rigid materials and arranged to be folded to a collapsed position overlying the trunk of an automobile on which the camper is mounted. In the embodiment of FIGS. 15-18, a camper capsule 20' has lower and upper portions 22', 24'. Some of the walls of the upper foldable portion 24' are formed from flexible material such as canvas supported on frames, and the foldable upper portion 24' is positionable in a stowed or folded position overlying the trunk of an automobile on which the camper is mounted.

Figure 1:
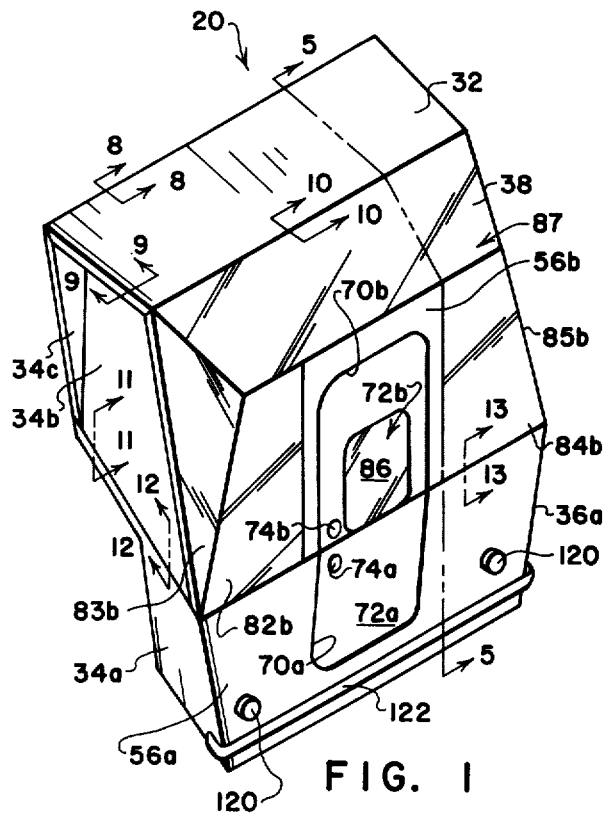
FIG. 1 is a perspective view of a camper capsule illustrating one embodiment of the present invention, the capsule being shown with its foldable side, front, top and back wall portions in their extended, operational position.

Referring to FIGS. 1 and 5, the camper capsule 20 is shown in its extended or operating position wherein its exterior walls define a habitable enclosure. The enclosure may be thought of as comprising two interconnected regions which will be referred to as "primary" and "secondary" compartments, indicated in FIG. 5 by the numerals 42, 52. The primary compartment 42 is a region which is taller than the secondary compartment 52 and which is positioned rearwardly of the trunk compartment of an automobile when the camper capsule 20 is mounted on an automobile. The secondary compartment 52 forms a forwardly-extending extension of upper portions of the primary compartment, and overlies the trunk lid of an automobile when the camper capsule 20 is mounted on an automobile. The bottom structure 22 defines lower portions of both the primary and secondary compartments 42, 52. The foldable upper structure 24 defines upper portions of the primary and secondary compartments 42, 52.

As is explained in detail in the referenced Utility Patent, the camper capsule 20 is provided with a unique mounting system for supporting it about trunk portions of an automobile. Inasmuch as the mounting system is described in detail in the referenced Utility Patent, it need not be described in detail here. The mounting system includes a bumper mounting assembly indicated in FIG. 5 by the numeral 160, and a body mounting assembly indicated by the numeral 200. The mounting assemblies 160, 200 require the formation of no holes in body portions of an automobile, whereby the watertight integrity of its trunk compartment is maintained. The bumper mounting assembly 160 is operable to pivotally mount the camper capsule 20 for movement to a position out of the path of movement of the trunk lid of an automobile, whereby ready access may be had to the trunk compartment of the automobile on which the camper capsule 20 is mounted.

The bottom structure 22 includes a bottom wall 40 which defines the floor of the primary compartment, and a bottom wall 50 which defines the floor of the secondary compartment 52. A forwardly facing wall 54 interconnects the bottom walls 40, 50. Lower side wall portions 34a, 36a clad opposite side regions of lower portions of compartments 42, 52. A lower rear wall portion 56a closes the lower portion of the primary compartment 42, while a lower front wall portion 58a closes the lower portion of the secondary compartment 52.

The foldable upper structure 24 includes a forwardly-extending top wall portion 32 and a rearwardly-extending top wall portion 38. An upper front wall portion 58b extends from the lower front wall portion 58a into engagement with the forward end of the top wall portion 32. An upper rear wall portion 56b extends from the lower rear wall portion 56a upwardly into engagement with the rearward edge of the top wall portion 38. A pair of trapezoidal-shaped panels 82b, 84b extend along opposite sides of the upper rear wall portion 56b to close the rear wall of the primary compartment 42. A pair of triangular-shaped panels 83b, 85b join with the upper wall portion 38 and with the rear wall panels 82b, 84b to close portions of the sides of the primary compartment 42.

In preferred practice, the top wall portion 38, the panels 82b, 83b, 84b, 85b and the upper rear wall portion 58b are rigidly interconnected and form what will be called a cover assembly 87. The cover assembly 87 is movable, as will be explained, to a position wherein it overlies and covers the open upwardly facing top of the bottom structure 22. The top wall portion 38 and the panels 82b, 83b, 84b, 85b are preferably formed from transparent material to provide windows for the camper capsule 20.

Figure 2:
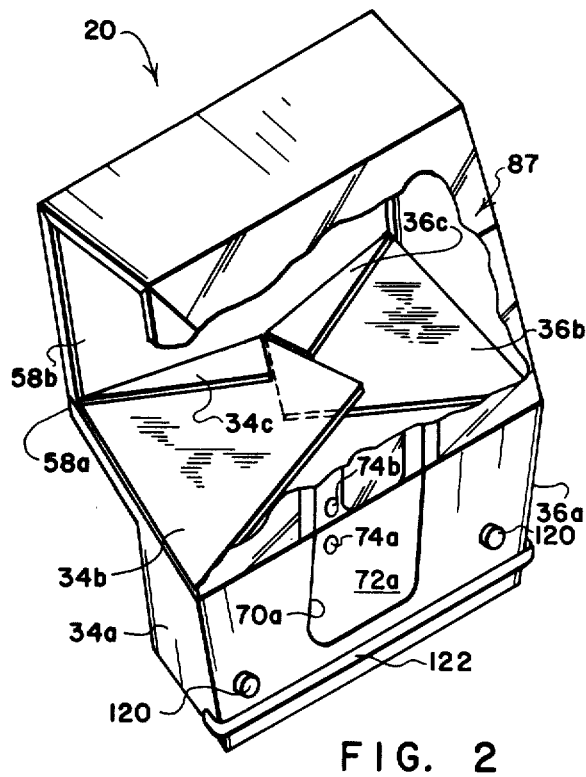
FIG. 2 is a perspective view similar to FIG. 1 with side wall portions of the camper capsule folded inwardly to their collapsed position, and with other portions of the camper capsule broken away to permit the inwardly folded side wall portions to be viewed.

The remaining open side regions of the primary and secondary compartments 42, 52 are closed by left side wall portions 34b, 34c and by right side wall portions 36b, 36c. As is best seen in FIG. 2, the right side wall portions 36b, 36c are foldable inwardly to a position lying inside the lower regions of the compartments 42, 52. Once the right side wall portions 36b, 36c have been folded inwardly as shown in FIG. 2, the left side wall portions 34b, 34c can be folded inwardly in a similar fashion to lie within the lower regions of the compartments 42, 52.

Figure 3:
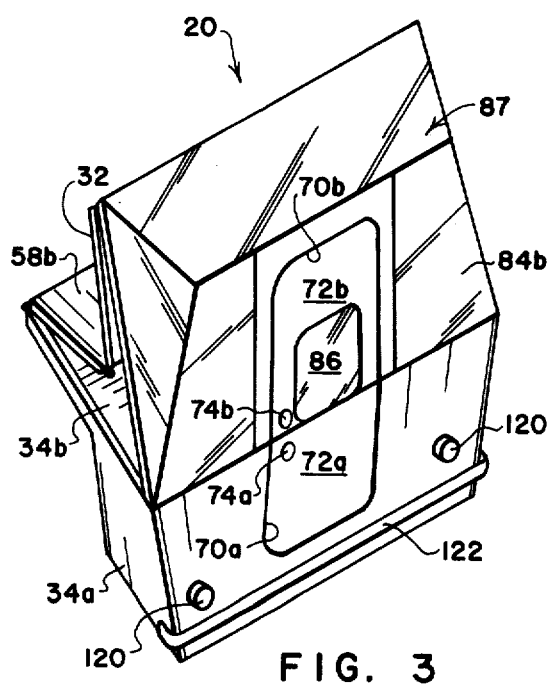
FIG. 3 is a view similar to FIG. 1 with side wall portions folded inwardly and showing front, top and back wall portions during the process of their being folded or moved to a collapsed position for over-the-road travel.
Figure 4:
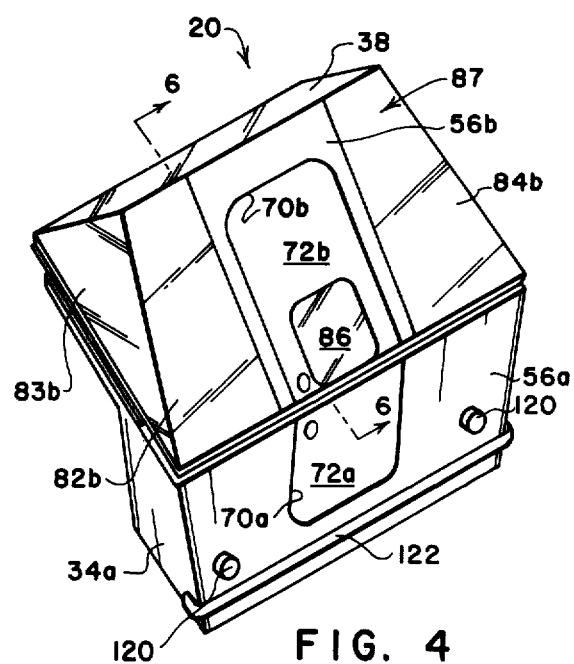
FIG. 4 is a view similar to FIG. 3 with the front, top and back wall portions in their collapsed position.

As is best seen in FIG. 3, after the side wall portions 34b, 34c, 36b, 36c have been folded inwardly as is shown in FIG. 2, the front and top wall portions 58b, 32 can be folded inwardly by initially rocking the cover assembly 87 rearwardly, and then by pivoting the cover assembly 87 forwardly. As the front and top wall portions 58b, 32 are folded inwardly to overlie each other, the cover assembly 87 is pivoted forwardly to a position wherein it overlies and closes bottom regions of the compartments 42, 52, as is best seen in FIG. 4. Suitable releasable fasteners, not shown, are provided for retaining the cover assembly 87 in its folded or collapsed position for over-the-road travel.

Figure 6:
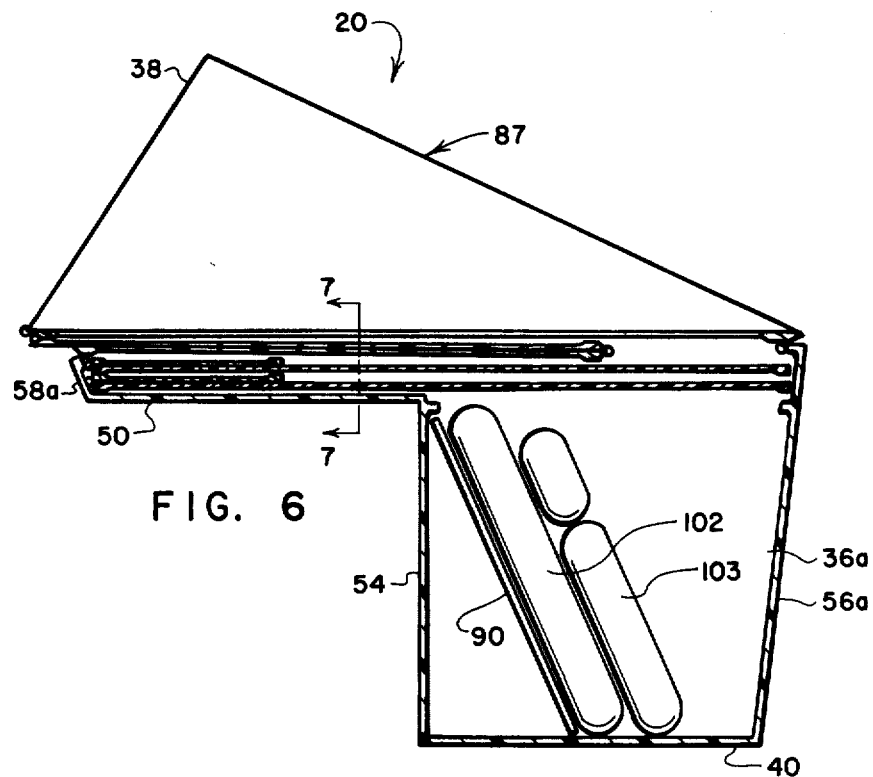
FIG. 6 is a sectional view similar to FIG. 5, as seen from a plane indicated by a line 6—6 in FIG. 4.
Figure 7:
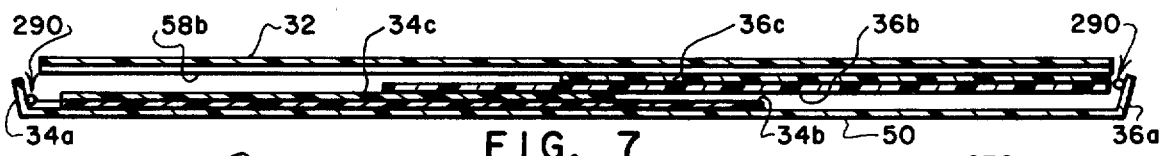
FIG. 7 is a sectional view as seen from a plane indicated by a line 7—7 in FIG. 6.

Referring to FIGS. 6 and 7, the folded positions of the various wall portions of the camper capsule 20 are illustrated in greater detail. In the folded position, the top wall portion 32 overlies the front wall portion 58b; the right side wall portions 36c, 36b underlie the front wall portion 58b; and the left side wall portions 34c, 34b underlie the right side wall portions 36c, 36b and rest atop the bottom wall 50.

Figure 8:
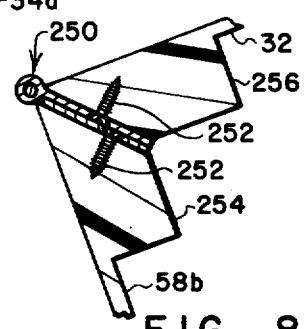
FIGS. 8, 9, 10, 11, 12 and 13 are enlarged sectional views as seen from planes indicated generally by lines 8—8, 9—9, 10—10, 11—11, 12—12, and 13—13 in FIG. 1.

In order for the several wall portions which form the foldable upper structure 24 to pivot and move in the manner described, suitable hinges are provided. Referring to FIGS. 5 and 8, the front and top wall portions 58b, 32 are interconnected by hinges 250. The hinges 250 may be secured by threaded fasteners 252 to enlarged end formations 254, 256 of the wall portions 58b, 32. In a similar manner, hinges 260, 270, 280, 290, 300 and 310 are provided as shown in FIGS. 5 and 10-13 to pivotally interconnect others of the wall portions 32, 34a, 34b, 34c, 36a, 36b, 36c, 38, 56a, 56b, 58a, 58b, and the cover assembly 87. As is shown in FIG. 14, the hinges 270 permit the cover assembly to be pivoted upwardly to open a major portion of the primary compartment 42 for loading and unloading of the camper capsule 20.

Figure 9:
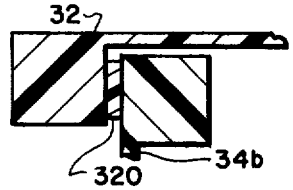
Figure 10:
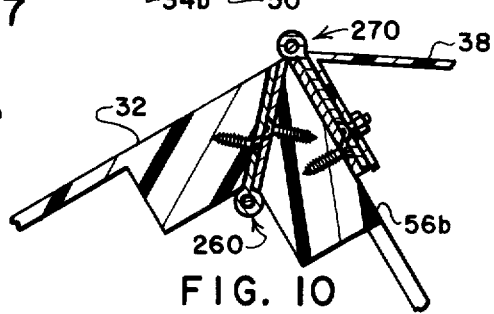
Figure 11:
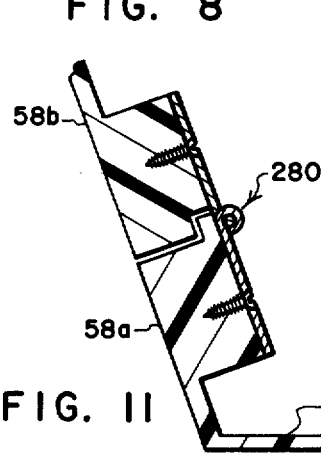
Figure 12:
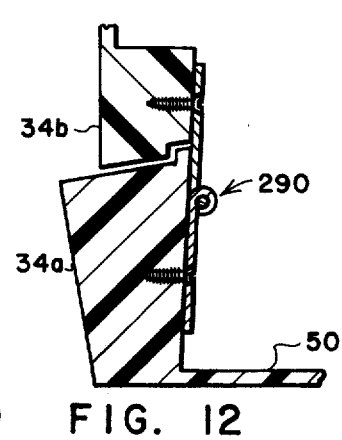
Figure 13:
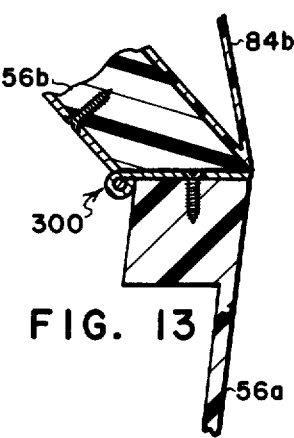

Referring to FIG. 9, suitable resilient sealing strips 320 are provided between mating portions of the walls which form the foldable upper structure 24 as needed to facilitate the formation of a watertight, habitable enclosure when the foldable upper structure 24 is in its extended, operative position. Suitable releasable fasteners, not shown, are also provided for releasably retaining the various wall portions which form the foldable upper structure 24 in their extended or operative position.

Referring to FIG. 1, lower and upper door openings 70a, 70b are provided in the lower and upper rear wall portions 56a, 56b. The door openings 70a, 70b cooperate to define a substantially rectangular passage for entry to and exit from the interior of the camper capsule 20. Lower and upper doors 72a, 72b are pivotally mounted on the rear wall portions 56a, 56b for selectively opening and closing the door openings 70a, 70b. Conventional lockable door latches 74a, 74b are provided for retaining the doors 72a, 72b in their closed position.

In addition to the windows provided by the panels 38, 82b, 84b, 85b, other windows may be provided in the camper capsule 20. A front window 80 is preferably provided in the upper front wall portion 58b, as best seen in FIG. 5. A rear window 86 is preferably provided in the upper door portion 72b.

Referring to FIG. 5, the bottom wall 50 provides a sleeping platform which may be extended by a cot 90. The cot 90 is preferably formed from relatively rigid material and may be stored for over-the-road travel in the lower region of the primary compartment 42, as illustrated in FIG. 6. The cot 90 may be formed in a plurality of segments arranged side-by-side with each of the segments having front and rear portions supported on inwardly projecting lips 55, 57 formed on the walls 54, 56a. By utilizing a series of segments, a portion of the primary compartment 42 can be kept for standing room while other portions can be devoted to seating areas.

Cushions, indicated generally by numerals 102 and 103, are provided for positioning atop the bottom wall 50, as shown in FIG. 5. During transit, the cushions 102, 103 are preferably stored in the lower portion of the primary compartment 42, as illustrated in FIG. 6.

When the cot 90 is in its sleeping position, as shown in FIG. 5, and when the cushions 102, 103 are positioned to overlie the bottom wall 50 and the cot 90, a comfortable bed is provided which is capable of sleeping two adults side-by-side. Additionally, the primary compartment portion located beneath the cot 90, when the cot is in its sleeping position, can sleep a third adult.

Suitable taillights 120 and bumper formations 122, and such other conventional hardware as may be desired to enhance the longevity and safety of operation of the camper capsule 20, may be provided on exterior wall portions of the camper capsule. Other optional accessories such as are described in the referenced Utility Patent may also be provided on the camper capsule 20.

Figure 15:
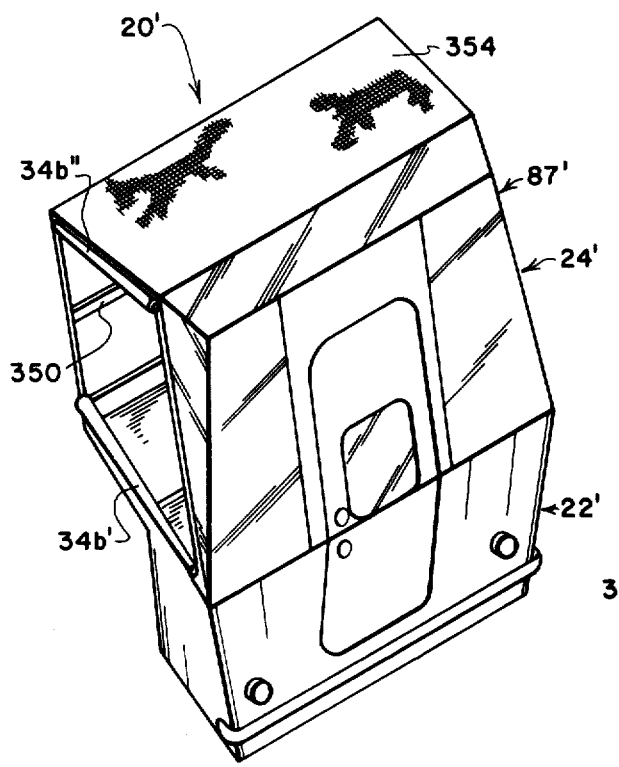
FIG. 15 is a perspective view of a camper capsule illustrating an alternate embodiment of the present invention, with one side wall portion of the camper capsule in a non-extended position.
Figure 16:
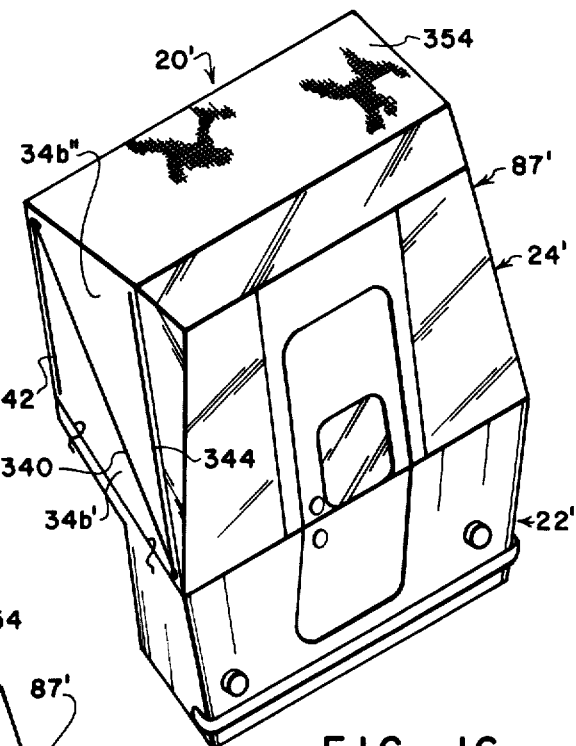
FIG. 16 is a perspective view similar to FIG. 15 with the one side wall portion in its extended position.

Referring to FIGS. 15 and 16, an alternate form of camper capsule embodying the present invention is indicated generally by the numeral 20'. The camper capsule 20' includes a rigid bottom structure 22' identical with that utilized in the camper capsule 20. The camper capsule 20' includes a foldable upper structure 24' which is substantially the same as the foldable upper structure 22 except that some of its wall portions are formed of flexible fabric, and the flexible fabric is supported by a foldable framework.

The camper capsule 22' includes a rearwardly facing cover assembly 87' which is substantially the same as that utilized in the capsule 20, and which is movable as described in conjunction with the camper capsule 20 to close the bottom structure 22' when the movable walls of the upper structure 24' assume their folded or collapsed position. The cover assembly 87' is configured to provide the camper capsule 20' with a somewhat shorter overall height than is provided by the assembly 87 of the camper 20, whereby the driver of an automobile on which the capsule 20' is mounted can see "over" the top of the capsule 20'. As will be apparent, the cover assembly 87 can be configured to provide this same feature.

Figure 17:
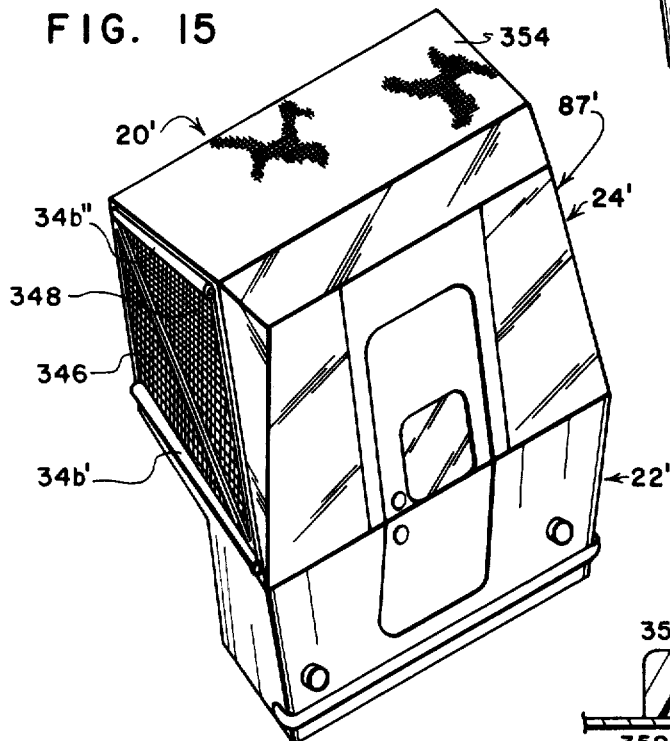
FIG. 17 is a perspective view similar to FIG. 15 illustrating the use of side walls having screens formed therein.

Instead of utilizing rigid side wall members 34b, 34c, 36b, 36c, the camper capsule 20' may be provided with canvas side wall members as indicated by the numerals 34b', 34b'' in FIGS. 15 and 16. The side wall members 34b', 34b'' can be coiled and tied, as shown in FIG. 15, to open the left side of the camper capsule 20', or can be supported in an extended position by means of a zipper connection 340 extending between the members 34b', 34b'', and by means of zipper connections 342, 344 extending along the forward, rearward edges of the members 34b', 34b''. As illustrated in FIG. 17, zipper-mounted screen wall members 346, 348 may be provided inside the side walls 34b', 34b''.

Figure 18:
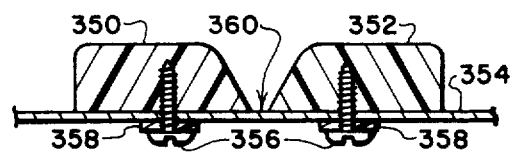
FIG. 18 is an enlarged section view of a portion of the camper capsule of FIG. 15.

In the camper capsule embodiment 22', separate frames are preferably provided for supporting the front wall portion 58b' and the top wall portion 32'. Instead of utilizing conventional hinges to mount the front and top wall frames for pivotal movement, the flexible canvas fabric 354 used to cover the frames is preferably utilized to form hinges. Referring to FIG. 18, adjacent portions of these separate frames are indicated generally by the numerals 350, 352. Threaded fasteners 356 clamp rubber washers 358 against the fabric 354 to secure portions of the canvas fabric 354 to the frame portions 350, 352. Fabric portions 360 lying between the frames 350, 352 serve as a hinge to permit pivotal movement of the frames 350, 352. By this arrangement, the frames 350, 352 can pivot relative to each other with the fabric portion 360 providing a supporting and connecting medium between the frames 350, 352.

As will be apparent from the foregoing description, the present invention provides a simple and relatively inexpensive, foldable unit which can be mounted with ease on automobiles of a wide variety of configurations to serve the travel and sleeping needs of three adults.

Although the invention has been described in its preferred form with a certain degree of particularity, it is understood that the present disclosure of the preferred form has been made only by way of example and numerous changes in the details of construction and the combination and arrangement of parts may be resorted to without departing from the spirit and scope of the invention as hereinafter claimed. It is intended that the patent shall cover, by suitable expression in the appended claims, whatever features of patentable novelty exist in the invention disclosed.

What is claimed is:

1. A trunk-mountable camper capsule for automobiles, comprising:
   (a) structure defining a relatively tall "primary" compartment adapted to be positioned rearwardly of the trunk compartment of an automobile, and defining a relatively shorter "secondary" compartment communicating with upper portions of the primary compartment and extending forwardly therefrom for overlying the trunk compartment of an automobile;
   (b) the structure including first and second bottom walls defining the floors of the "primary" and "secondary" compartments, respectively, and including front, rear, top and side wall portions cooperating with the bottom walls to define an enclosure;
   (c) lower portions of the walls which define the "primary" and "secondary" compartments being formed from rigid materials and cooperating to define a relatively rigid, upwardly-opening base;
   (d) upper portions of the walls which define the "primary" and "secondary" compartments being movable between a collapsed over-the-road position overlying the upwardly opening base, and an extended, operational position wherein the upper wall portions cooperate with the lower wall portions to define a habitable enclosure; and,
   (e) mounting means for releasably mounting the camper capsule about the trunk compartment of an automobile with the "primary" compartment rearwardly of the trunk compartment and with the "secondary" compartment overlying the trunk compartment.

2. The camper capsule of claim 1 wherein certain of the upper wall portions are formed from relatively rigid material and are hingedly mounted for movement between the collapsed and extended positions.

3. The camper capsule of claim 2 wherein selected of the certain upper wall portions are operable to form a rigid watertight cover for the base when the upper wall portions are in their collapsed over-the-road position.

4. The camper capsule of claim 3 wherein at least a part of the selected portions is formed of transparent material.

5. The camper capsule of claim 1 wherein certain of the upper wall portions are formed from relatively flexible material supported on a framework, the certain wall portions and their associated framework being movable between the collapsed and extended positions.

6. The camper capsule of claim 5 wherein other of the upper wall portions are formed from relatively rigid material and are operable to form a rigid watertight cover for the base when the upper wall portions are in their collapsed over-the-road position.

7. The camper capsule of claim 6 wherein at least a part of the selected portions is formed of transparent material.

8. The camper capsule of claim 1 wherein cot means is provided within the compartment-defining means including structure movable between a storage position located in a lower portion of the "primary" compartment and a sleeping position extending centrally through the "primary" compartment to provide a bed platform which extends contiguously with the bottom wall of the "secondary" compartment.

9. The camper capsule of claim 8 wherein lower wall portions of the structure cooperate to define a region located below the cot means when the cot means is in its sleeping position, the region being of sufficient size to sleep a third adult lying transversely therein.

10. The camper capsule of claim 1 additionally including cushion means supported atop the bottom wall of the "secondary" compartment.

11. The camper capsule of claim 1 wherein a door opening is provided in the rear wall, and pivotally mounted door means is provided for selectively opening and closing the door opening.

12. The camper capsule of claim 1 wherein the mounting means includes bumper mounting means for releasably attaching the capsule to the bumper of an automobile.

13. The camper capsule of claim 12 wherein the bumper mounting means is operable to establish a pivotal connection between the camper capsule and the bumper for permitting the camper capsule to be pivoted rearwardly out of the path of movement of the automobile's trunk lid.

14. The camper capsule of claim 12 wherein the mounting means additionally includes body mounting means engageable with automobile body portions near the trunk lid opening for releasably attaching the bottom wall of the "secondary" compartment thereto.

15. The camper capsule of claim 1 wherein at least a portion of the rear wall is pivotally mounted for opening movement when the upper wall portions are in their extended, operational position to facilitate loading and unloading of the camper capsule.

16. A trunk-mountable camper capsule for automobiles, comprising:
(a) structure defining an enclosure having a "primary" compartment portion adapted to extend rearwardly of the trunk compartment of an automobile, and a "secondary" compartment portion in communication with the "primary" compartment portion and adapted to overlie the trunk compartment portion;
(b) lower portions of the structure which overlie and extend along the trunk compartment of an automobile being formed from relatively rigid material;
(c) mounting means for releasably mounting the structure portions about the trunk compartment of an automobile with the "primary" compartment portion extending rearwardly of, and a "secondary" compartment portion overlying, the trunk compartment;
(d) upper portions of the structure being movable between a collapsed, over-the-road position overlying the automobile trunk compartment, and an extended operational position wherein the camper capsule provides a habitable enclosure; and
(e) the mounting means mounting the camper capsule for pivotal movement about the trunk compartment to a position out of the path of movement of the automobile's trunk lid.

17. The camper capsule of claim 16 wherein the mounting means includes:
(a) bumper mounting means for releasably pivotally mounting the lower structure portions on the bumper of the automobile; and,
(b) body mounting means for releasably attaching the lower structure portions to automobile body portions near the trunk lid opening.

18. A trunk-mountable camper capsule for automobiles, comprising:
(a) structure defining an enclosure having a "primary" compartment portion adapted to extend rearwardly of the trunk compartment of an automobile, and a "secondary" compartment portion in communication with the "primary" compartment portion and adapted to overlie the trunk compartment;
(b) lower portions of the structure which overlie and extend along the trunk compartment of an automobile being formed from relatively rigid material and providing an upwardly-opening base forming lower regions of both of the "primary" and "secondary" compartment portions;
(c) mounting means for releasably mounting the structure portions about the trunk compartment of an automobile with the "primary" compartment portion extending rearwardly of, and with the "secondary" compartment portion overlying, the trunk compartment; and,
(d) upper portions of the structure including front, top and rear wall portions which are interconnected for folding movement between a collapsed, over-the-road position overlying the automobile trunk compartment, and an extended, operational position wherein the camper capsule provides a habitable enclosure.

19. The camper capsule of claim 18 wherein selected portions of the interconnected top and rear walls are operable to form a rigid watertight cover for the lower portions of the structure.

20. The camper capsule of claim 19 wherein at least a part of the selected portions is formed of transparent material.

* * * * *